United States Patent
Schekulin

(10) Patent No.: US 10,432,128 B2
(45) Date of Patent: Oct. 1, 2019

(54) FREQUENCY CONVERTER

(71) Applicant: Schmidhauser AG, Romanshorn (CH)

(72) Inventor: Dirk Schekulin, Wienacht-Tobel (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 15/121,792

(22) PCT Filed: Feb. 27, 2015

(86) PCT No.: PCT/EP2015/054166
§ 371 (c)(1),
(2) Date: Aug. 26, 2016

(87) PCT Pub. No.: WO2015/128477
PCT Pub. Date: Sep. 3, 2015

(65) Prior Publication Data
US 2017/0012564 A1 Jan. 12, 2017

(30) Foreign Application Priority Data

Feb. 28, 2014 (DE) .......................... 10 2014 203 781

(51) Int. Cl.
*H02P 27/06* (2006.01)
*H02M 1/12* (2006.01)
(Continued)

(52) U.S. Cl.
CPC .............. *H02P 27/06* (2013.01); *H02M 1/12* (2013.01); *H02M 3/158* (2013.01); *H02M 5/458* (2013.01);
(Continued)

(58) Field of Classification Search
CPC ....... H02K 11/048; H02K 11/33; H02P 27/06; H02P 29/50; H02P 23/04; H02M 5/4585;
(Continued)

(56) References Cited

U.S. PATENT DOCUMENTS 4,066,938 A    1/1978  Turnbull
7,112,936 B2 *  9/2006  Lee .......................... H02P 6/10
                                        318/400.01
(Continued)

FOREIGN PATENT DOCUMENTS

CN    1808832 A    7/2006
CN    102668356 A  9/2012
(Continued)

OTHER PUBLICATIONS

International Search Report (PCT/ISA/210) issued in PCT Application No. PCT/EP2015/054166 dated Jun. 16, 2015 with English translation (Six (6) pages).
(Continued)

*Primary Examiner* — Thai T Dinh
(74) *Attorney, Agent, or Firm* — Crowell & Moring LLP

(57) ABSTRACT

A frequency converter is used for generating at least one frequency converter output voltage a prescribable frequency converter output voltage amplitude and a prescribable frequency converter output voltage frequency for an electric motor. The frequency converter has: a clocked DC/DC converter is designed to generate from an input direct voltage having an input voltage level a DC/DC converter output voltage having a DC/DC converter output voltage level, wherein the DC/DC converter is designed to generate the DC/DC converter output voltage level based on the prescribable frequency converter output voltage amplitude, and a clocked inverter having a number of controllable switches, to which inverter the DC/DC converter output voltage is applied and which actuates the switches with an inverter switching frequency such that the at least one frequency converter output voltage with the prescribable frequency converter output voltage frequency is generated from the DC/DC converter output voltage.

6 Claims, 3 Drawing Sheets

(51) Int. Cl.
*H02M 3/158* (2006.01)
*H02M 5/458* (2006.01)
*H02M 7/5387* (2007.01)
*H02P 23/04* (2006.01)
*H02M 1/32* (2007.01)
*H02M 1/00* (2006.01)

(52) U.S. Cl.
CPC .......... *H02M 7/5387* (2013.01); *H02P 23/04* (2013.01); *H02M 1/32* (2013.01); *H02M 2001/007* (2013.01)

(58) Field of Classification Search
CPC ...... H02M 7/483; H02M 1/12; H02M 5/4505; H02M 7/5387
See application file for complete search history.

(56) References Cited

U.S. PATENT DOCUMENTS

| | | | | |
|---|---|---|---|---|
| 8,080,969 | B2* | 12/2011 | Koenig | H02P 25/08 318/432 |
| 8,953,345 | B2 | 2/2015 | Jimichi et al. | |
| 9,236,820 | B2* | 1/2016 | Mikail | H02P 6/10 |
| 9,252,689 | B2* | 2/2016 | Fukunaga | H02P 6/10 |
| 2004/0165868 | A1* | 8/2004 | Sato | H02M 7/48 388/804 |
| 2005/0007799 | A1 | 1/2005 | Schreiber et al. | |
| 2006/0208686 | A1* | 9/2006 | Takada | H02P 6/06 318/801 |
| 2008/0247204 | A1 | 10/2008 | Renken | |
| 2009/0058341 | A1* | 3/2009 | Lu | H02P 23/0004 318/504 |
| 2009/0058351 | A1* | 3/2009 | Messersmith | H02M 5/22 318/809 |
| 2009/0108785 | A1* | 4/2009 | Takada | H02P 6/08 318/400.38 |
| 2011/0187308 | A1* | 8/2011 | Suhama | H02P 27/04 318/798 |
| 2012/0242262 | A1 | 9/2012 | Atarashi et al. | |
| 2013/0119902 | A1* | 5/2013 | Gries | H02M 1/15 318/400.3 |
| 2013/0249462 | A1* | 9/2013 | Beichter | H02M 1/4225 318/504 |
| 2015/0028786 | A1 | 1/2015 | Schiffmann et al. | |

FOREIGN PATENT DOCUMENTS

| | | |
|---|---|---|
| CN | 103259444 A | 8/2013 |
| CN | 203434871 U | 2/2014 |
| DE | 36 13 918 A1 | 10/1986 |
| DE | 10 2005 041 825 A1 | 3/2007 |
| DE | 10 2005 042 321 A1 | 3/2007 |
| DE | 10 2005 047 373 A1 | 4/2007 |
| DE | 10 2010 042 915 A1 | 4/2012 |
| DE | 10 2012 002 089 A1 | 8/2013 |
| JP | 2007-181398 A | 7/2007 |

OTHER PUBLICATIONS

German-language Written Opinion (PCT/ISA/237) issued in PCT Application No. PCT/EP2015/054166 dated Jun. 16, 2015 (Six (6) pages).

Ruan, X., et al., "Three-Level Converters—A New Approach for High Voltage and High Power DC-to-DC Coversion", Power Electronic Specialists Conference, IEEE, vol. 2, Jun. 23, 2002, pp. 663-668, XP010747457 (Six (6) pages).

Chinese-language Office Action issued in counterpart Chinese Application No. 201580011145.4 dated May 2, 2018 (six (6) pages).

Partial English translation of Chinese-language Office Action issued in counterpart Chinese Application No. 201580011145.4 dated May 29, 2019 (12 pages).

* cited by examiner

FREQUENCY CONVERTER

BACKGROUND AND SUMMARY OF THE INVENTION

The invention relates to a frequency converter.

The invention is based on the object of providing a frequency converter having a high efficiency.

The invention achieves this object by means of a frequency converter for generating at least one frequency converter output voltage which is used for driving an electric motor, wherein the at least one frequency converter output voltage has a prescribable frequency converter output voltage amplitude and a prescribable frequency converter output voltage frequency, the frequency converter comprising: a clocked DC/DC converter which is designed to generate from an input direct voltage comprising an input voltage level a DC/DC converter output voltage having a prescribable DC/DC converter output voltage level, wherein the DC/DC converter is designed to generate the DC/DC converter output voltage level in dependence on the prescribable frequency converter output voltage amplitude, and a clocked inverter comprising a number of controllable switches, to which inverter the DC/DC converter output voltage is applied and which is designed to actuate the switches with an inverter switching frequency in such a manner that the at least one frequency converter output voltage with the prescribable frequency converter output voltage frequency is generated from the DC/DC converter output voltage.

The frequency converter is designed to generate at least one drive voltage or frequency converter output voltage which is used for driving an electric motor. The at least one frequency converter output voltage is typically an AC voltage. The frequency converter output voltage can be a phase voltage of an electric motor. The at least one frequency converter output voltage has an adjustable frequency converter output voltage amplitude and an adjustable frequency converter output voltage frequency. The frequency converter output voltage frequency determines, for example, a frequency of rotation of a resultant magnetic field and thus a rotational speed of the electric motor, wherein the frequency converter output voltage amplitude determines, for example, the torque produced by means of the electric motor. In this respect, the relevant technical literature is also referred to.

The frequency converter has a clocked DC/DC converter which is designed to generate from an input direct voltage having an input voltage level a DC/DC converter output voltage having a DC/DC converter output voltage level, wherein input voltage level and DC/DC converter output voltage level can be different. The DC/DC converter is designed to generate the DC/DC converter output voltage level in dependence on the prescribable, prescribed or desired frequency converter output voltage amplitude. The DC/DC converter can generate the DC/DC converter output voltage level in such a manner that it corresponds to the prescribable frequency converter output voltage amplitude or is equal to the prescribable frequency converter output voltage amplitude, respectively.

The frequency converter also has a clocked inverter having a number of controllable switching devices which, for example, can be a component of a bridge circuit (for example a three-phase transistor bridge). The inverter has applied to it the DC/DC converter output voltage and is designed to actuate its switching devices independently of the prescribable frequency converter output voltage amplitude with a respective inverter switching frequency in such a manner that the at least one frequency converter output voltage with the prescribable frequency converter output voltage frequency is generated from the DC/DC converter output voltage.

The inverter switching frequency, i.e. the switching frequency of a respective switching means of the inverter can correspond to the frequency converter output voltage frequency, i.e. the inverter switching frequency and the frequency converter output voltage frequency can be identical, i.e. the inverter is operated with fundamental clocking or block clocking, respectively.

The DC/DC converter can be designed to generate the DC/DC converter output voltage level in dependence on the prescribable frequency converter output voltage amplitude and additionally in dependence on a precontrol signal or modulation signal. The frequency converter or a control unit of the frequency converter which, for example, controls the operation of the frequency converter and generates associated drive signals for all components to be activated, can also be designed to generate the precontrol or modulation signal and, in particular, to generate it in such a manner that a torque ripple is minimized.

The precontrol or modulation signal can be, for example, a sinusoidal or a rectified sinusoidal signal which has a frequency which is a multiple, for example a three- to six-fold of the frequency converter output voltage frequency. An amplitude of the precontrol or modulation signal can depend, for example, on the frequency converter output voltage amplitude and/or on the frequency converter output voltage frequency. The precontrol or modulation signal, particularly the amplitude and/or the frequency of the precontrol or modulation signal can also be generated in dependence on the following quantities:

motor voltages,
motor currents,
a nominal/actual angular position of a rotor of the electric motor activated,
a nominal/actual angular position of a voltage vector corresponding to the output voltages,
a nominal/actual angular position of a current vector and/or
any combinations of the quantities mentioned above.

Naturally, the frequency converter can have sensors suitable for detecting the above-mentioned quantities.

For example, the DC/DC converter can be designed to generate the DC/DC converter output voltage level in dependence on the prescribable or prescribed frequency converter output voltage amplitude and additionally in dependence on the precontrol signal or modulation signal, in such a manner that the DC/DC converter output voltage level corresponds to a sum or to a difference of the prescribable or prescribed frequency converter output voltage amplitude and the precontrol or modulation signal.

By means of the precontrol or modulation signal, the increased torque ripple due to the fundamental clocking or block clocking at low rotational speeds can be reduced or eliminated, respectively, by precontrolling the DC chopper.

The frequency converter can be designed for generating precisely three frequency converter output voltages which then, for example, form the phase voltages of a three-phase electric motor in order to actuate, for example, a three-phase AC motor.

The controllable switches of the inverter and/or one or more controllable switches of the DC/DC converter can be unipolar circuit breakers, for example MOSFETs. At least two of the controllable switches of the inverter and/or of the DC/DC converter can be connected in parallel.

According to the invention, a decoupling of the voltage position and frequency position of the frequency converter output voltage or frequency converter output voltages is effected by means of the DC/DC converter or DC chopper. As a result of the thus possible low inverter switching frequency (fundamental clocking or block clocking) or of a unidirectional DC chopper operation, it is possible to use unipolar power switches (MOSFETs). Due to the possibility of connecting the circuit breakers in parallel, a power loss can be reduced to such an extent that cost-effective new concepts of structure and cooling become possible. By using unipolar power semiconductors connected in parallel, both in the DC/DC converter and in the inverter, output powers within a range of several kW can be provided for example by means of SMD power semiconductors without massive heat sinks.

However, apart from MOSFETs, bipolar power semiconductors such as IGBTs can also be used. Combinations of MOSFETs and IGBTs are also conceivable.

The frequency converter can have a multiphase rectifier for generating the input direct voltage.

BRIEF DESCRIPTION OF THE DRAWINGS

The invention will be described in detail with reference to the drawings in the text which follows, in which, diagrammatically.

DETAILED DESCRIPTION OF THE DRAWINGS

Figure 1:
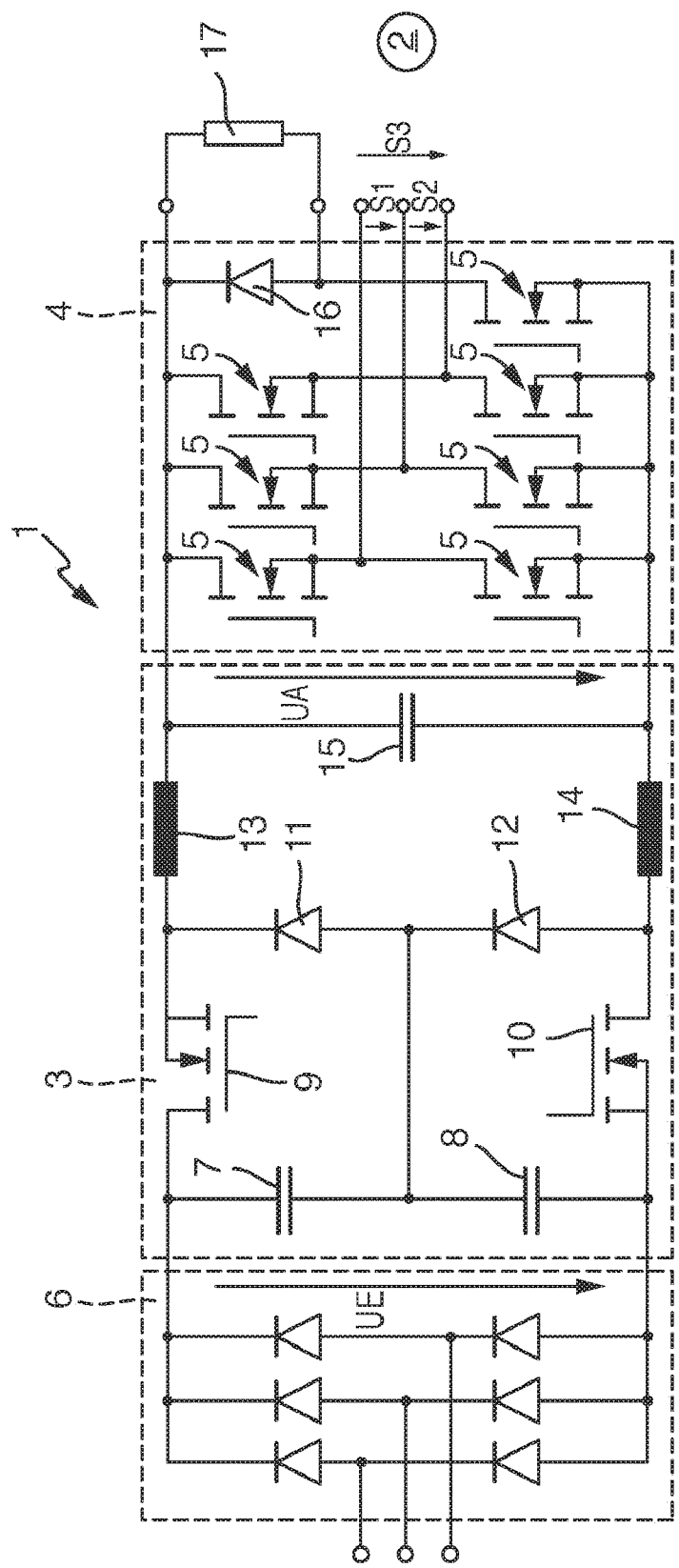
FIG. 1 shows a frequency converter according to a first embodiment.

FIG. 1 shows a frequency converter 1 for generating frequency converter output voltages S1, S2, S3 which are applied to associated phase windings of a conventional three-phase electric motor 2. The frequency converter output voltages S1, S2, S3 have an adjustable frequency converter output voltage amplitude AA and an adjustable frequency converter output voltage frequency AF (see FIG. 3).

The frequency converter 1 has conventionally a three-phase rectifier 6 for generating an input direct voltage UE from a three-phase alternating supply voltage.

The rectifier 6 is followed by a clocked DC chopper or DC/DC converter 3 in the form of a step-down converter which is designed to generate from the input direct voltage UE a DC/DC converter output voltage UA, buffered by means of a capacitor 15, having a lower level compared with the input direct voltage UE.

The DC/DC converter 3 has two capacitors 7 and 8 which are connected in series between the input direct voltage UE. Between a connecting terminal of the capacitor 7 at which the positive potential of the input direct voltage UE is present, and an output connecting terminal of the direct-voltage converter 3 at which the positive potential of the DC/DC converter output voltage UA is present, a switch in the form of a MOSFET 9 and a coil 13 are connected in series. Between a connecting terminal of the capacitor 8 at which the negative potential of the input direct voltage UE is present and the other output connecting terminal of the DC/DC converter 3 at which the negative potential of the DC/DC converter output voltage UA is present, a switch in the form of a MOSFET 10 and a coil 14 are connected in series.

Diodes 11 and 12 are connected in series between a connecting node of the MOSFET 9 and the coil 13 and a connecting node of the MOSFET 10 and the coil 14, the anodes of diodes 11 and 12 being electrically connected to one another.

The DC/DC converter 3 is followed by a clocked inverter 4 having a number of controllable switches 5 in the form of MOSFETs which form three half bridges. Differently from those shown, a number of MOSFETs can be connected in parallel in order to reduce conductive losses.

A diode 16 is connected in series with another one of the controllable switches 5, which is not a component of a half bridge, between the DC/DC converter output voltage UA and is conventionally used for actuating a braking chopper resistor 17. The associated switch 5 of the braking chopper resistor 17 is controlled in dependence on the level of the DC/DC converter output voltage UA. For this purpose, a hysteresis controller can be used, for example, which, when an upper limit level is overshot switches on and when a lower limit level is undershot switches off again. Reference is also made to the relevant technical literature in this respect.

All switches 5, 9 and 10 are actuated by a control unit, not shown explicitly, which controls the operation of the frequency converter 1 and which can be, for example, a microprocessor or a digital signal processor.

Figure 2:
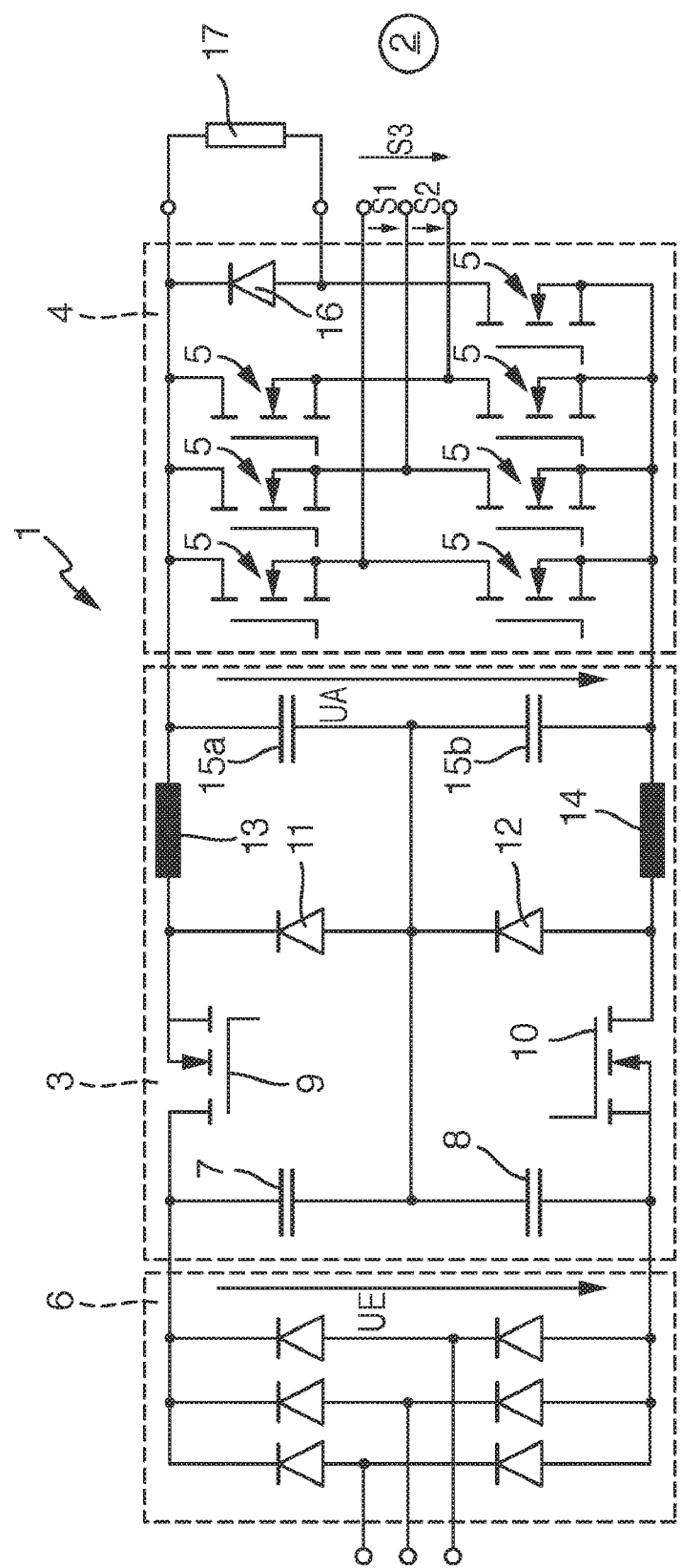
FIG. 2 shows a frequency converter according to a further embodiment.
Figure 3:
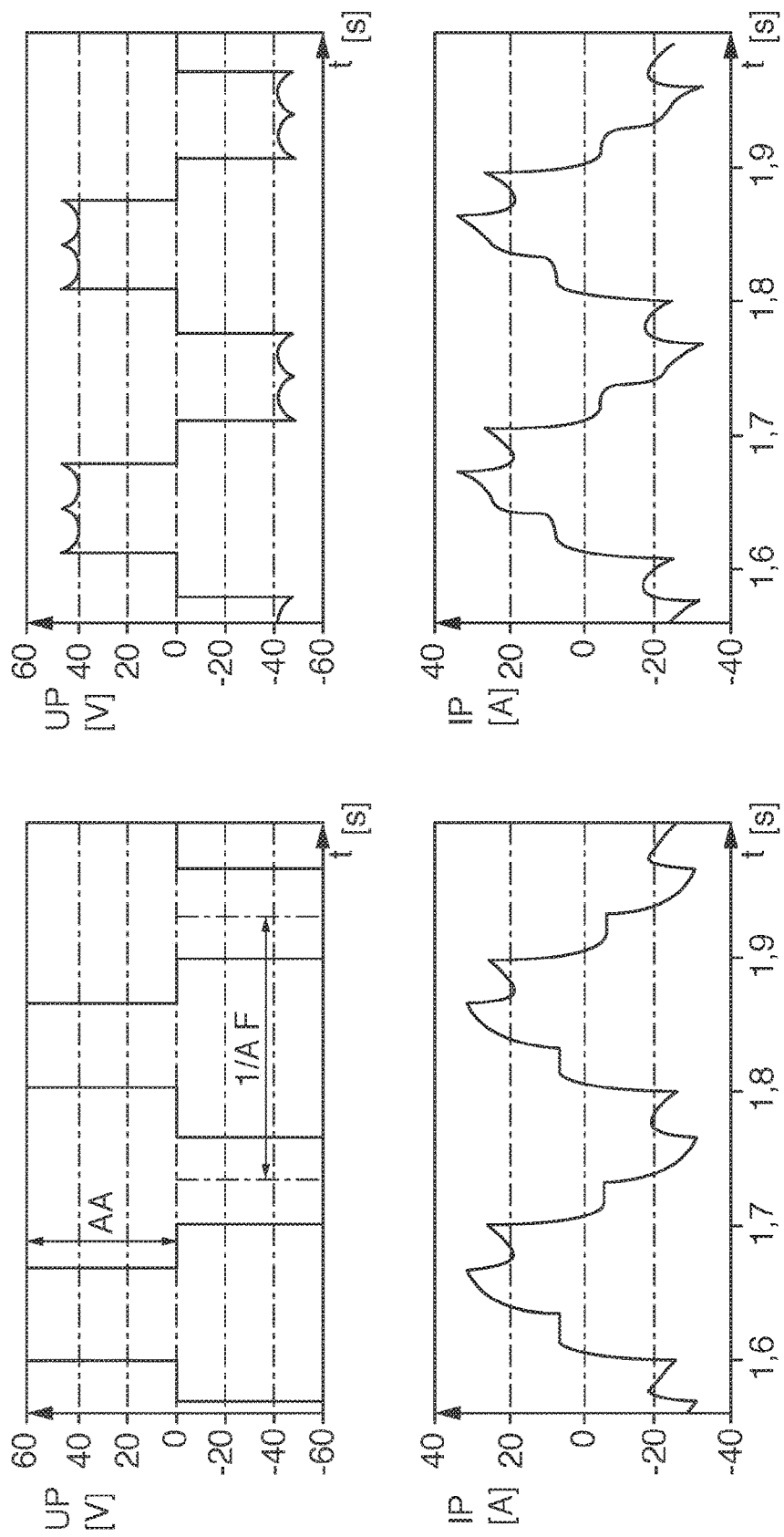
FIG. 3 shows a phase current and a phase voltage of an electric motor actuated by means of the frequency converter from FIG. 1 or 2, respectively, with and without modulation of an output level of a DC/DC converter output voltage of a DC/DC converter of the frequency converter from FIG. 1 or 2, respectively.

FIG. 3 shows a phase current IP and a phase voltage UP of a phase winding of the electric motor 2, actuated by means of the frequency converter from FIG. 1 or 2, respectively, without modulation (illustration on the left) and with modulation (illustration on the right) of the output level of the DC/DC converter output voltage UA. The phase voltage UP corresponds (in idealized manner) to one of the frequency converter output voltages S1, S2 and S3, respectively, in the present example to the frequency converter output voltage S1. The two remaining phase voltages have an (idealized) identical variation apart from a phase shift.

The illustration on the left shows that the inverter 4 is operated in fundamental clocking or block clocking, respectively. The switches 5 of the inverter 3 are clocked with the fundamental frequency AF of the frequency converter output voltage S1 or UP, respectively, i.e. an inverter switching frequency with which the switches 5 are actuated corresponds to the frequency converter output voltage frequency AF. The inverter 4 sets or determines exclusively the frequency AF of the frequency converter output voltage S1 or UP, respectively, but not the frequency converter output voltage amplitude AA. The frequency converter output voltage amplitude AA is (in idealized manner) identical with the level of the DC/DC converter output voltage UA. By suitably clocking the switches 9 and 10 of the DC/DC converter 3, the frequency converter output voltage amplitude AA, in consequence, is prescribable or adjustable and by suitably clocking the switches 5, the frequency converter output voltage frequency AF can be adjusted or prescribed.

In the present text, the frequency converter output voltage amplitude AA is, by way of example, approx. 60 V and the frequency converter output voltage frequency AF is approx. 5 Hz.

The illustration on the right shows that the DC/DC converter 3 is designed to generate the DC/DC converter output voltage level not only in dependence on the prescribable frequency converter output voltage amplitude AA but also additionally in dependence on a precontrol or modulation signal in order to reduce a torque ripple at low rotational speeds. The precontrol or modulation signal is a rectified sinusoidal signal having the six-fold frequency converter output voltage frequency AF and an 0.1-fold amplitude of the frequency converter output voltage amplitude AA wherein the DC/DC converter output voltage level corresponds to a difference between the frequency converter output voltage amplitude AA and the precontrol or modulation signal.

The modulation signal can be generated by the control unit which also actuates the switches 5, 9 and 10 and generates their actuating signals, respectively.

FIG. 2 shows a variant of the DC chopper 3 in which the capacitor 15 from FIG. 1 is replaced by two series-connected capacitors 15*a* and 15*b*, a connecting node of the capacitors 15*a* and 15*b* being electrically coupled to the anodes of the diodes 11 and 12.

The embodiments according to the invention basically deviate from a conventional inverter topology. Conventionally, output voltage amplitude and frequency are provided in accordance with the requirements of the motor by pulse width modulation (PWM) and inverter switching frequencies within a range of typically 4 to 16 kHz. Due to the clocked frequency converter output voltage, shielded motor lines or additional sinusoidal filters are required in most cases for EMC reasons. The power semiconductor switches are frequently constructed integrated as IGBTs in a power module in which the heat is produced concentrated and delivered to the environmental air or cooling water via an aluminum heat sink. Due to the fact that the IGBT bridge has to be clocked in the kHz range, it has to have good commutation properties and requires compromises with regard to switching and conductive characteristics of the power semiconductors. In principle, switching and conductive losses cannot be optimized separately from one another with this converter topology.

The invention achieves this object in principle and, as a result, provides for completely new concepts of structure and cooling.

According to the invention, a DC chopper (step-down converter) 3 is inserted between the intermediate voltage circuit and the three-phase transistor bridge 4. By this means, the three-phase transistor bridge 4 can be clocked at the fundamental oscillation, for example in a frequency range between 0 Hz to 1 kHz. Due to the low inverter switching frequency of the inverter switches 5, it is possible to optimize for the on-state losses and the switching losses are of lower priority. The DC chopper 3 handles the amplitude setting, clocks at high frequency, for example in a frequency range between 50 kHz and 200 kHz and can thus be optimized toward the switching losses.

By using parallel-connected unipolar power semiconductors both in the DC chopper and in the inverter part, the losses can thus be reduced so that, using SMD power semiconductors, output powers within a range of several kW are possible without massive heat sinks. Due to the lacking massive heat sink, completely new structural concepts are possible, e.g. SMD heat sinks on the circuit board.

A disadvantage of increased torque ripple at low rotational speeds due to fundamental clocking can be solved by precontrolling the DC chopper 3.

The invention claimed is:

1. A frequency converter for generating at least one frequency converter output voltage which is a phase voltage of an electric motor, wherein the at least one frequency converter output voltage has a frequency converter output voltage amplitude and a frequency converter output voltage frequency, the frequency converter output voltage amplitude determines a torque produced by the electric motor, and the frequency converter output voltage frequency determines a rotational speed of the electric motor, the frequency converter comprising:
   a clocked DC/DC converter which is designed to generate from an input direct voltage comprising an input voltage level a DC/DC converter output voltage having a DC/DC converter output voltage level, wherein the clocked DC/DC converter is designed to generate the DC/DC converter output voltage level based on a predetermined frequency converter output voltage amplitude modified by a modulation signal configured to minimize a torque ripple; and
   a clocked inverter comprising a number of controllable switches, to which inverter the DC/DC converter output voltage is applied and which is designed to actuate the switches with an inverter switching frequency in such a manner that the at least one frequency converter output voltage with the modified predetermined frequency converter output voltage amplitude and a predetermined frequency converter output voltage frequency is generated from the DC/DC converter output voltage,
   wherein
      the inverter switching frequency corresponds to the prescribable frequency converter output voltage frequency, and
      the frequency converter is configured such that the modified predetermined frequency converter output voltage amplitude is generated by the clocked DC/DC converter before the DC/DC converter output voltage is applied to the inverter.

2. The frequency converter as claimed in claim 1, wherein the frequency converter is designed for generating precisely three frequency converter output voltages.

3. The frequency converter as claimed in claim 1, wherein the controllable switches of the inverter are unipolar circuit breakers.

4. The frequency converter as claimed in claim 3, wherein at least two of the controllable switches of the inverter are connected in parallel.

5. The frequency converter as claimed in claim 1, further comprising:
   a rectifier for generating the input direct voltage.

6. The frequency converter as claimed in claim 1, wherein the DC/DC converter is a step-down converter.

* * * * *